United States Patent [19]

Crider

[11] Patent Number: 4,972,382

[45] Date of Patent: Nov. 20, 1990

[54] TIME VARIANT SUPPRESSION OF COHERENT NOISE SIGNALS IN A SEISMIC SECTION

[75] Inventor: Richard L. Crider, Houston, Tex.

[73] Assignee: Amoco Corporation, Chicago, Ill.

[21] Appl. No.: 359,808

[22] Filed: May 31, 1989

[51] Int. Cl.$^5$ .............................................. G01V 1/36
[52] U.S. Cl. ........................................ 367/43; 367/38
[58] Field of Search ...................... 367/43, 38, 73, 74; 364/421

[56] References Cited

U.S. PATENT DOCUMENTS

| 4,535,417 | 8/1985 | Peacock | 367/45 |
| 4,837,723 | 6/1989 | Peacock | 364/421 |

OTHER PUBLICATIONS

"Optimum Multichannel Velocity Filters", Sengbush et al., Geophysics, vol. 33, #1, 2/88.
"After Stock Multichannel Filters without Mixing Effects", Casseno et al., Geophysical Prospecting, vol. 22, pp. 330–344.
"Time Varient Dip–Fittering in the Tcu-P Domein", Technical Note, Arizo–Exploration Group, p0006/2/88.

Primary Examiner—Ian J. Lobo
Attorney, Agent, or Firm—Fred E. Hook; Timothy D. Stanley

[57] ABSTRACT

Time-invariant multichannel seismic data filters are applied to seismic data traces for rejecting coherent noise signals within a time-space window. In one embodiment, these filters are applied for rejecting all signals having the same trace-to-trace slopes as the coherent noise signal. Segments of the filtered traces that are within the time-space window are added to corresponding segments of unfiltered traces outside of the time window for producing reconstituted time-variantly filtered traces. In another embodiment, these filters are applied for rejecting the coherent noise signals and passing all other signals within the time-space window and passing all signals outside of the window for producing time-variantly filtered traces.

8 Claims, 5 Drawing Sheets

TIME VARIANT SUPPRESSION OF COHERENT NOISE SIGNALS IN A SEISMIC SECTION

BACKGROUND

Seismic data can contain coherent noise signals, along with seismic reflection signals. Noise signals interfere with the interpretation of the seismic signals and have been suppressed during the processing of seismic data. Differences in the characteristics of coherent noise signals and seismic reflection signals have provided the basis for suppressing noise signals without also suppressing seismic reflection signals.

The suppression of coherent noise signals in a seismic section based on differences in trace-to-trace slopes between noise signals and seismic reflection signals is described by R. L. Sengbush and M. R. Foster in "Optimum Multichannel Velocity Filters," *Geophysics*, vol. 33, no. 1 (February 1968), pp. 11–35. Coherent noise signals and seismic reflection signals are described as often having overlapping frequency and wave length content, but having different ranges of trace-to-trace slopes. The use of multichannel filters is described for passing seismic reflection signals and rejecting coherent noise signals. This time-invariant approach for suppressing coherent noise signals is described as based on probability distributions for characteristics of the coherent noise signals and the seismic reflection signals.

The time-invariant use of optimum multichannel seismic data filters is described by E. Cassano and F. Rocca in "After-Stack Multichannel Filters Without Mixing Effects," vol. 22, *Geophysical Prospecting* (1974), pp. 330–344. It is described that superior results are achieved by assuming that signal components contained in different traces are independent from each other and that the multichannel filters are required to have a sufficient number of channels to suppress coherent noise signals when their trace-to-trace slopes are close to the trace-to-trace slopes for seismic reflection signals in the low frequency region.

These filters are referred to as velocity filters and as dip filters. When they are constructed for considering changes in time over space, they are referred to as dip filters. When they are constructed for considering changes in space over time, they are referred to as velocity filters.

It has now been discovered that these time-in-variant filters can be used by a seismic data analyst in a time-variant manner for suppressing coherent noise signals in selected portions of seismic sections. The time-in-variant use of these filters can result in the suppression of seismic reflection signals, along with coherent linear noise signals when the seismic reflection signals have similar characteristics to the noise signals that are being suppressed.

SUMMARY OF THE INVENTION

The seismic data analyst, in accordance with this invention, recognizes a coherent noise signal on a seismic section and identifies a time-space window on the seismic section that includes the coherent noise signal and does not include other signals having the same trace-to-trace slope as the coherent noise signal. A multichannel seismic data filter is applied to the seismic data traces that were combined to form the display for rejecting the noise signal within the time-space window.

In one embodiment, the filter is applied to a set of seismic data traces for rejecting the noise signal along with all other signals having the same trace-to-trace slope. Segments of the set of filtered traces that are within the time-space window are then added, in time order, to time-windowed segments from corresponding unfiltered traces for reconstituting the traces. Under circumstances where the time-space window does not extend across all of the seismic section, traces with filtered segments are combined with unfiltered traces for producing a complete seismic section.

In another embodiment, the filter is applied for rejecting the noise signal within the time-space window and passing all other signals. Outside of the time-space window, all signals are passed.

The resulting traces have had the noise signal suppressed in a time-variant manner. The suppression of noise signals in a time-invariant manner can result in the suppression of seismic reflection signals, along with the coherent noise signals.

DETAILED DESCRIPTION

In the time-variant method of this invention for suppressing a coherent noise signal on seismic sections, a seismic data analyst identifies a coherent noise signal on a time-domain display of seismic data. The analyst also identifies a time-space window on the display that includes the coherent noise signal and does not include other signals having the same trace-to-trace slope as the coherent noise signal.

In one embodiment, a set of the seismic data traces that form the display can then be filtered to reject the noise signal and all other signals having the same trace-to-trace slope as the noise signal. A set of filtered traces and a set of unfiltered traces are then divided into time windowed segments. One time window corresponds to the time-space window identified by the analyst and contains a segment of the filtered traces that has had the noise signal rejected and all other signals passed. This time-windowed segment of the traces that has had the noise signal removed is then added, in time order, to corresponding time-windowed segments from the set of unfiltered traces for reconstituting the traces. Unfiltered segments can be added as necessary, either above or below the filtered segment or above and below the filtered segment for producing reconstituted traces.

Figure 1:
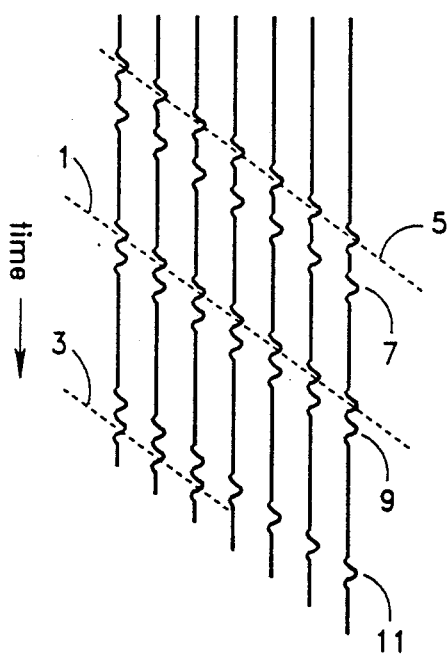
FIG. 1 is a representation of a common-shot gather of seismic data that includes seismic reflection signals and coherent noise signals.
Figure 2:
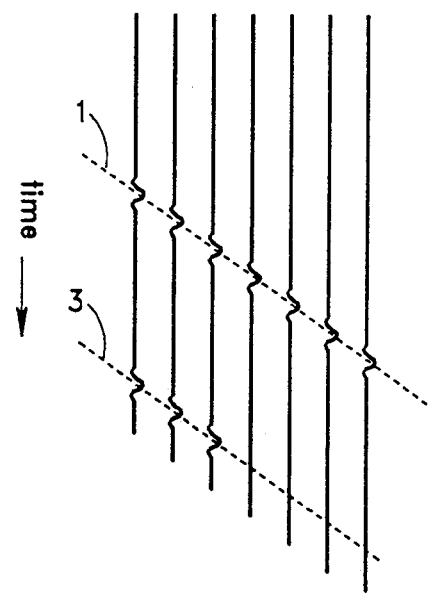
FIG. 2 is a representation of the coherent noise signals included in the seismic data shown on FIG. 1.

An illustration of a common-shot gather of seismic data traces from spaced apart seismic data receivers that contains coherent noise signals 1 and 3 and seismic reflection signals 5, 7, 9 and 11 is shown on FIG. 1. The coherent noise signals 1 and 3 are also shown on FIG. 2. On FIGS. 1 and 2, it is illustrated that the coherent noise signals 1 and 3 have the same trace-to-trace slope as the first seismic reflection signals 5 and appear on the traces at a later time.

The seismic reflection signals 5, 7, 9, and 11 are illustrated as a family of signals, with each member of the family having different trace-to-trace slopes. The trace-to-trace slopes of seismic reflection signals arriving at later times will be lower than those arriving earlier due to the increased angles of reflection of the signals from deeper seismic events. The noise signals 1 and 3 are illustrated as having the same trace-to-trace slopes at each occurrence on the traces. This gives the seismic data analyst a time-variant basis for distinguishing coherent noise signals from seismic reflection signals.

Figures 3, 4:
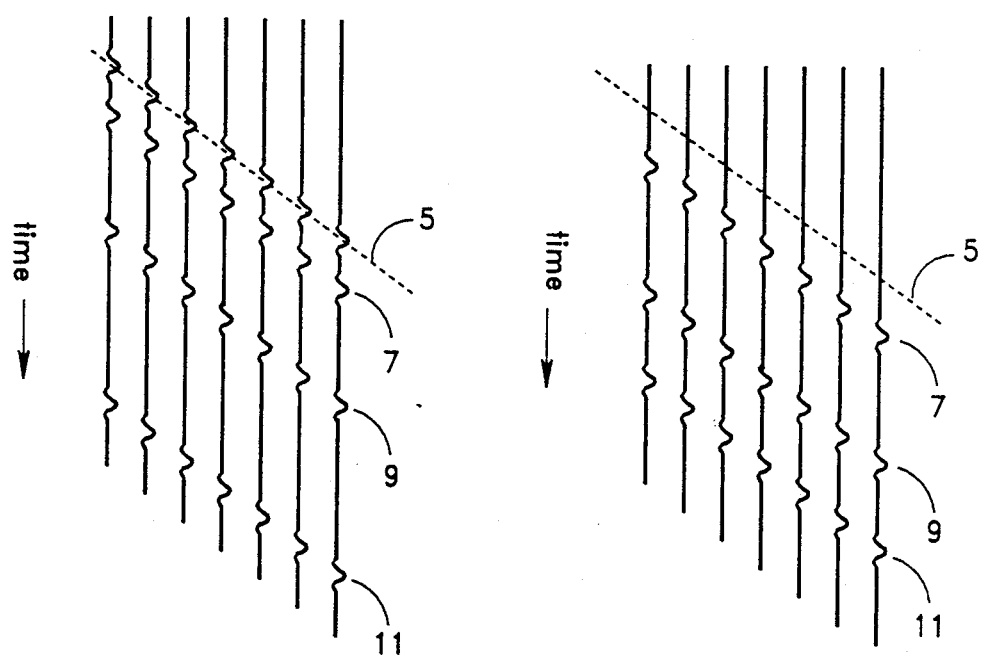
FIG. 3 is a representation of the seismic data shown on FIG. 1 after time-variant filtering in accordance with this invention to suppress the coherent noise signals shown on FIG. 2.
FIG. 4 is a representation of the seismic data shown on FIG. 1 after time-invariant filtering to suppress the coherent noise signals shown on FIG. 2.

The seismic data traces illustrated on FIG. 3 are representative of the results that can be obtained by the time-variant filtering of the seismic data traces on FIG. 1 in accordance with this invention. Seismic data traces illustrated on FIG. 4 are representative of the suppression of seismic reflection signals that can result from the use of multichannel seismic data filters in a time-invariant manner for the suppression of coherent noise signals based on differences in trace-to-trace slopes between the noise and reflection signals.

Figure 5:
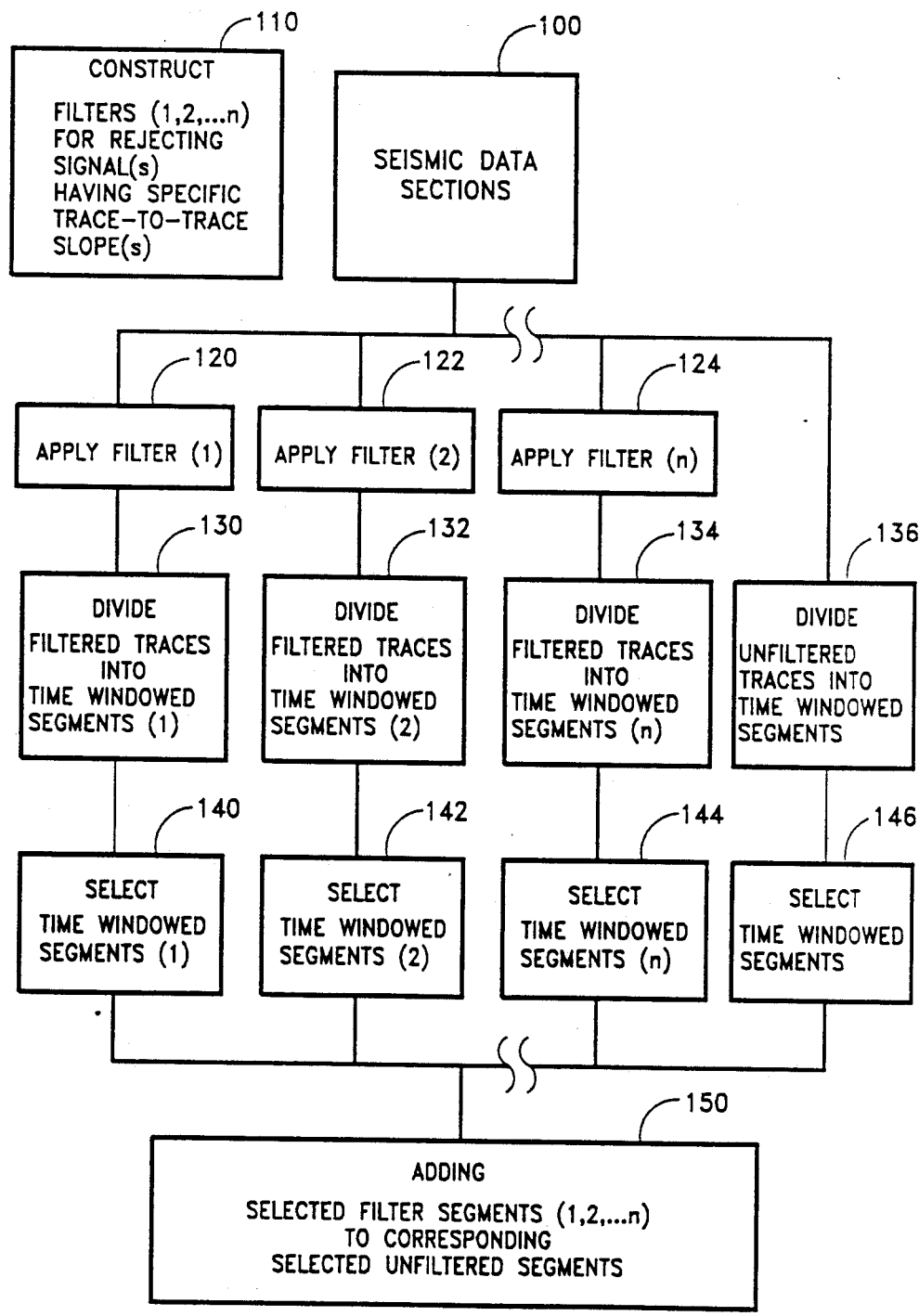
FIG. 5 illustrates an approach for the time-variant suppression of coherent noise signals on a seismic section in accordance with this invention.

A flow chart is shown on FIG. 5 to illustrate the time-variant method of this invention for suppressing coherent noise signals on seismic sections. Signals that appear to represent coherent noise are identified on a display of seismic data 100. Coherent noise signals can be identified on seismic sections such as common-shot gathers of seismic data traces.

One or a plurality of multichannel seismic data filters (1, 2, ... n) are constructed 110 as necessary for suppressing coherent noise signals and all other signals having the same trace-to-trace slopes. Each filter is constructed for rejecting one or a plurality of signals having specific ranges of trace-to-trace slopes. The time-invariant seismic data filters described by E. Cassano and F. Rocca in "After-Stack Multichannel Filters Without Mixing Effects," vol. 22, *Geophysical Prospecting* (1974), pp. 330–344, are examples of filters that are useful for suppressing noise signals on seismic sections in accordance with the time-variant method of this invention. Filters that can be applied in either the time or frequency domain are useful for suppressing coherent noise signals in accordance with this invention.

Each filter (1, 2, ... n) is applied 120, 122, and 124 to a complete set of seismic data traces for rejecting signals having specific ranges of trace-to-trace slopes and passing signals having all other trace-to-trace slopes. Each set of filtered traces is then divided 130, 132, and 134 into time windowed segments. Time windows are selected such that they will contain a segment of the traces from which the coherent noise signals have been rejected and will not include a portion of the traces from which other signals have been rejected. The time windows are selected from a time-domain display of the seismic data.

An unfiltered set of traces is also divided 136 into the same set of time-windowed segments as the filtered sets. Filtered and unfiltered segments are then selected 140, 142, 144, and 146 and corresponding segments are added together 150, in time order, for producing a reconstituted set of time-variantly filtered traces.

A coherent noise signal may occur on only a portion of the traces that are combined to form a time-domain display of the seismic data. The seismic data analyst can identify a time-space window on the display that will include the coherent noise signals and will not include seismic reflection signals having the same trace-to-trace slope as the coherent noise signal and that are identified as being within the same time-window but not the same space-window as the coherent noise signal.

The filtered trace segments within the time-space window would be added to corresponding unfiltered segments for reconstituting the traces. The reconstituted traces would be added to unfiltered traces outside of the time-space window for producing a complete time-variantly filtered seismic section.

It has been found that discontinuities between the time windowed segments can be minimized by selecting the time windows such that the traces within the time windows will overlap and by the use of a ramp function for combining the segments. The size of the overlap and the parameters of the ramp function are empirically determined. A 12 sample overlap for the windows and a 24 sample ramp function have been used for reducing discontinuities.

Figure 6:
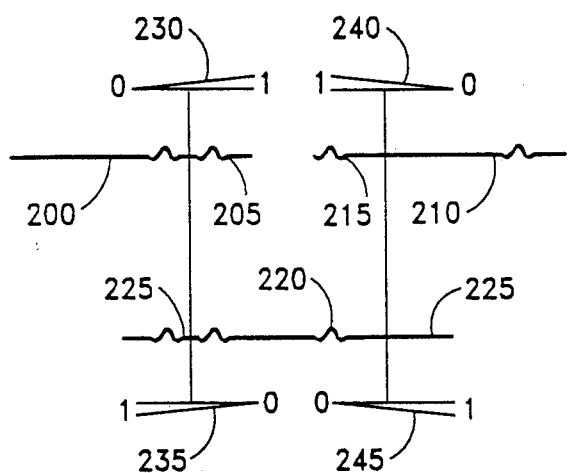
FIG. 6 illustrates an approach for adding time-windowed segments of a seismic trace together for reconstituting the seismic trace.

The use of overlapping time-windowed segments of traces and a ramp function for reducing discontinuities between the time-windowed segments is illustrated on FIG. 6. Two time-windowed trace segments 200 and 210 of a seismic data trace that have each been filtered to suppress coherent noise signals are shown on FIG. 6. These segments 200 and 210 are to be added to an unfiltered segment 220 of the trace to produce a reconstituted time-variantly filtered trace.

It is illustrated on FIG. 6 that the filtered trace segment 200 consists of the first 25 filtered digital samples of the trace and is extended by 12 filtered digital samples 205 such that it consists of filtered samples 1–37. The filtered trace segment 210 consists of filtered digital samples 55 to the end of the trace and is extended by 12 filtered digital samples 215 such that it consists of filtered samples 47 to the end of the trace. The unfiltered trace segment 220 consists of unfiltered samples 25–55 and is extended at each end by 12 unfiltered digital samples 225 such that it consists of unfiltered samples 13–67.

It is illustrated on FIG. 6 that the digital value of filtered samples 13–37 of extended trace segment 200 is multiplied by an increasing ramp function 230 that extends from a value of zero at sample 13 to a value of 1 at sample 37. The digital value of filtered samples 43–67 of extended trace 210 are multiplied by a decreasing ramp function 240 that extends from a value of 1 at sample 43 to a value of zero at sample 67. The digital value of unfiltered samples 13–37 of extended trace 220 are multiplied by a decreasing ramp function 235 that extends from a value of 1 at sample 13 to a value of zero at sample 37. The digital value of unfiltered samples 43–67 is multiplied by an increasing ramp function 245 that extends from a value of zero at sample 43 to a value of 1 at sample 67.

Figure 7:
FIG. 7 illustrates a seismic trace that has been reconstituted using the approach illustrated on FIG. 6.

The resulting digital values of samples 13–37 of extended trace segments 200 and 220 are then added together and the resulting digitized values of samples 47–67 of extended trace segments 210 and 220 are then added together for reconstituting the trace as illustrated on FIG. 7.

Figures 8, 9, 10:
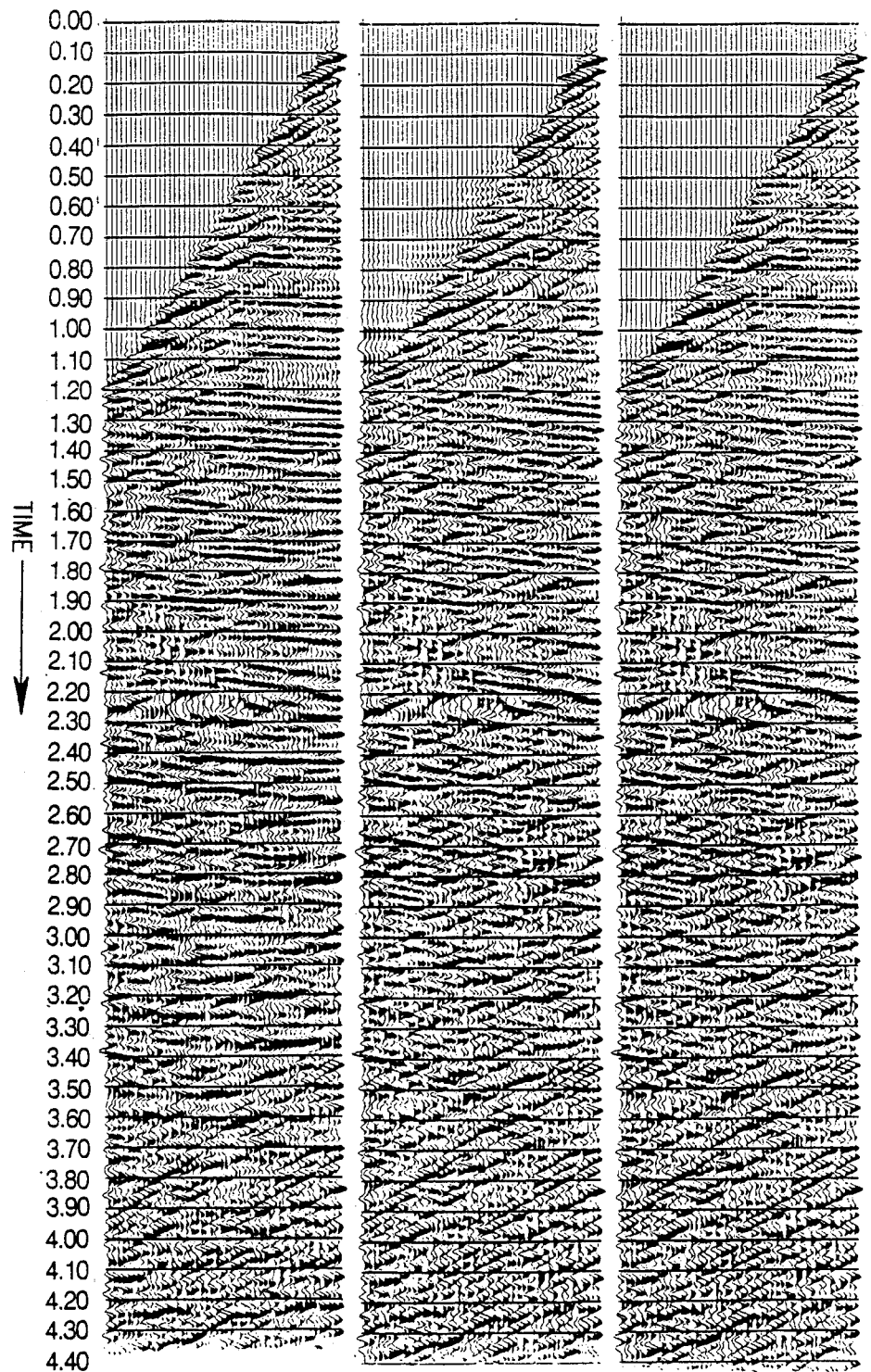
FIG. 8 shows a common-shot gather of marine seismic data traces.
FIG. 9 shows a common-shot gather of the marine seismic data traces shown on FIG. 8 that have been time-invariantly filtered to suppress signals having zero trace-to-trace slopes.
FIG. 10 shows a common-shot gather of marine seismic data traces shown on FIG. 8 after time-variant filtering in accordance with this invention to suppress signals having zero trace-to-trace slopes below 1.2 seconds.

Common-shot gathers of marine seismic data traces are shown on FIGS. 8, 9, and 10. A seismic data analyst has determined that the signals on FIG. 8 that occur above 1.2 seconds and have zero trace-to-trace slopes represent seismic reflection signals. Signals that occur below 1.2 seconds and have zero trace-to-trace slopes have been determined to represent coherent noise.

The seismic data traces which form the common-shot gather shown on FIG. 9 were produced by time-invariantly filtering the seismic data traces shown on FIG. 8 for rejecting all signals having zero trace-to-trace slopes.

The seismic data traces which form the common-shot gather shown on FIG. 10 were produced by adding time-windowed segments of filtered traces, as shown on FIG. 9, which were received between 1.2 seconds and the end of the trace, with corresponding segments of unfiltered traces, as shown on FIG. 8, which were received before 1.2 seconds.

While the invention has been described with a degree of particularity, it is to be limited only by the scope of the claims.

What is claimed is:

1. A method of producing a time-variantly filtered set of seismic data traces, comprising:
   constructing N time-invariant multichannel seismic data filters, wherein each filter is adapted to suppress coherent noise having a specific range of trace-to-trace slopes;
   applying each filter to a separate set of the seismic data traces for obtaining N sets of filtered traces;
   dividing each of the N sets of filtered traces into time-windowed segments for obtaining N time-windowed segments, wherein each time-windowed segment will contain a portion of the traces from which a coherent noise signal with a specific range of trace-to-trace slopes has been suppressed and will contain signals with trace-to-trace slopes different from that suppressed in the time-window; and
   adding, in time order, the N time-windowed, segments for producing a time-variantly filtered set of seismic data traces.

2. The method of claim 1 wherein the N sets of filtered traces are divided into overlapping time-windowed segments.

3. The method of claim 1 wherein the N time-windowed segments are multiplied by ramp functions prior to adding the segments.

4. The method of claim 1 wherein unfiltered seismic data traces are added to the time-variantly filtered set of seismic data traces for producing a time-variantly filtered seismic data section.

5. A method of producing a time-variantly filtered set of seismic data traces, comprising:
   constructing N time-invariant multichannel seismic data filters wherein each filter is adapted to suppress coherent noise having a specific range of trace-to-trace slopes;
   applying each filter to a separate set of the seismic data traces for obtaining N sets of filtered traces;
   dividing each of the N sets of filtered traces into time-windowed segments for obtaining N time-windowed segments, wherein each time-windowed segment will contain a portion of the traces from which a coherent noise signal with a specific range of trace-to-trace slopes has been suppressed and will contain signals with trace-to-trace slopes different from that suppressed in the time-window;
   dividing a set of the unfiltered traces into the same time-windowed segments; and
   adding, in time order, the N time-windowed segments and segments of the set of unfiltered traces for producing a time-variantly filtered set of seismic data traces.

6. The method of claim 5 wherein the N sets of filtered traces are divided in overlapping time-windowed segments.

7. The method of claim 5 wherein the N time-windowed segments are multiplied by ramp functions prior to adding the segments.

8. The method of claim 1 wherein unfiltered seismic data traces are added to the time-variantly filtered set of seismic data traces for producing a time-variantly filtered seismic data section.

* * * * *